United States Patent [19]
Krüger et al.

[11] Patent Number: 5,227,441
[45] Date of Patent: Jul. 13, 1993

[54] PREPARATION OF FLUOROPOLYMERS CONTAINING MASKED PHENOL GROUPS

[75] Inventors: Ralf Krüger, Bergisch Gladbach; Holger Lütjens, Cologne; Karl-Erwin Piejko, Bergisch Gladbach, all of Fed. Rep. of Germany

[73] Assignee: Bayer Aktiengesellschaft, Leverkusen, Fed. Rep. of Germany

[21] Appl. No.: 945,554

[22] Filed: Sep. 16, 1992

[30] Foreign Application Priority Data

Sep. 26, 1991 [DE] Fed. Rep. of Germany ....... 4132081

[51] Int. Cl.$^5$ .............................................. G08F 16/24
[52] U.S. Cl. .................... 526/247; 526/249; 526/254; 526/255; 526/279; 526/326
[58] Field of Search ............... 526/244, 247, 249, 254, 526/255, 279, 326

[56] References Cited

U.S. PATENT DOCUMENTS 3,451,978 6/1969 Chalmers et al. .
5,128,386 7/1992 Rehmer et al. ..................... 526/244

FOREIGN PATENT DOCUMENTS 0027009 4/1981 European Pat. Off. ............ 526/244
2026271 9/1970 France .

Primary Examiner—Joseph L. Schofer
Assistant Examiner—N. Sarofim
Attorney, Agent, or Firm—Sprung, Horn, Kramer & Woods

[57] ABSTRACT

Copolymers of fluoroethylenes and masked phenols of the formula

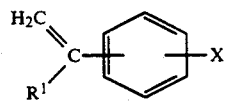

wherein
R$^1$ is H, C$_1$–C$_4$-alkyl, which may be further ring substituted and in which X is OY or

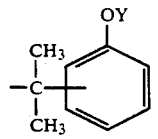

Y is Si(R$^3$)$_3$,

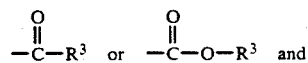

R$^3$ is alkyl, cycloalkyl or aryl.

5 Claims, No Drawings

PREPARATION OF FLUOROPOLYMERS CONTAINING MASKED PHENOL GROUPS

The present invention relates to fluorocopolymers containing masked phenol groups, cross-linked moldings produced from them and a process for the preparation of these copolymers and of the cross-linked moldings produced from them.

Fluoropolymers are used in technology whenever special properties are required, such as low surface tension, high chemical resistance or extreme resistance to ageing. For many applications, the fluoropolymers are cross-linked during or after molding, e.g. when they are to be used for rubbers. In the case of unmodified fluoroelastomers, i.e. those not containing any special reactive points, these cross-linking reactions require drastic conditions, with the result that cross-linking becomes difficult to control and damage to the fluoropolymer may occur, such as excessive dehydrofluorination during cross-linking in the presence of bisnucleophiles (bisphenols, bisamines), see e.g. W. W. Schmiegel; Angew. Makromolek, Chem. 76/77 (1979) 39–65. To avoid this, reactive points are introduced into the polymer chains, so-called cure-sites, at which cross-linking can take place selectively and under milder conditions. Such cure-sites are, for example, bromo- or iodo-substituents which are introduced into the fluoropolymer either by copolymerizing bromine- and/or iodine-containing vinyl compounds in small quantities with the fluoromonomers, see e.g. U.S. Pat. No. 3,351,619, U.S. Pat. No. 4,035,565, U.S. Pat. No. 4,214,060, DE 3 715 210, or by polymerizing in the presence of saturated compounds containing bromine and iodine, e.g. DE 2 815 187, DE 3 710 818. Such fluoropolymers which have been modified by bromine and/or iodine may undergo radical cross-linking, e.g. by peroxide, in the presence of a co-cross-linking agent.

Such peroxidically cross-linked fluorine rubbers have substantially improved resistance to bases, nucleophiles and oxidative attack compared, for example, to fluoropolymers which contain no special reactive points and are cross-linked with bisphenols, see e.g. G. Streit, S. Dunse: Kautschuk + Gummi, Kunststoffe 38 (1985) 471.

Fluoropolymers containing bromine or iodine have, however, the disadvantage that they can only be cross-linked or undergo further chemical modification by radical reactions.

There is therefore a demand for fluoropolymers containing reactive groups which enable them to undergo further chemical reactions and/or to be cross-linked under mild reaction conditions.

This requirement could in principle be fulfilled by the incorporation of monomers containing functional groups which are copolymerizable with fluoromonomers. It is known to those skilled in the art, however, that monomers containing reactive groups are vry difficult to copolymerize with fluoromonomers.

It has now been found that fluorine-containing vinyl compounds of the type mentioned below and masked phenols containing an olefinically unsaturated group of the type also described below can be copolymerized and can be cross-linked under mild conditions in the presence of a catalyst system after the masking group has been split off or can undergo further polycondensation or polyaddition reactions with suitable bifunctional compounds. The masked phenols containing an olefinically unsaturated group may be, for example, substituted styrene derivatives.

The invention relates to copolymers containing masked phenol groups composed of polymer units of a) from 50 to 99.9 mol-%, based on the molar numbers of all the comonomers, of one or more ethylenes containing 1 to 4 fluorine atoms, b) from 0 to 49.9 mol-%, based on the molar numbers of all the comonomers, of one or more comonomers selected from b1) straight chain or branched $C_3$–$C_8$-alkenes having at least one fluorine atom, b2) alkyl vinyl ethers having at least one fluorine atom, b3) open chain or cyclic $C_3$–$C_6$-ketones having fluorinated $\alpha,\alpha'$-positions and b4) non-fluorinated $C_2$–$C_4$-alkenes, $C_3$–$C_6$-alkyl vinyl ethers and $C_4$–$C_6$ vinyl esters and c) from 0.1–5 mol-%, based on the molar numbers of all the comonomers, of one or more comonomers selected from masked phenols containing an olefinically unsaturated group according to formula (I):

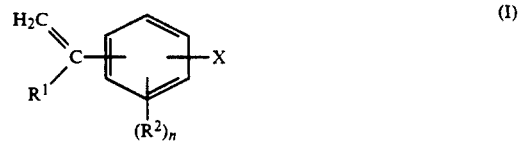

wherein
$R^1$ = H or $C_1$–$C_4$-alkyl,
$R^2$ = H, Cl, Br, F, $C_1$–$C_4$-alkyl, $C_6$–$C_{12}$-cycloalkyl or $C_1$–$C_4$-alkoxy, and
n = 0, 1 or 2, and

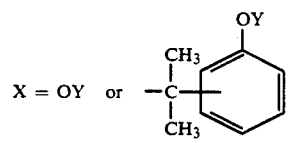

wherein Y denotes a protective group for masking the phenol function, which group is stable under polymerization conditions and may be subsequently split off by thermolysis, solvolysis or the like.

Y preferably stands for $Si(R^3)_3$,

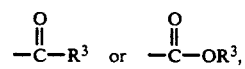

wherein $R^3$ = $C_1$–$C_4$-alkyl, $C_6$–$C_{12}$-cycloalkyl or a monovalent aromatic hydrocarbon group having 6–9 carbon atoms.

Compounds preferred as components c) are comonomers corresponding to formula (I) in which $R^1$ = $C_1$–$C_4$-alkyl and X=OY, wherein

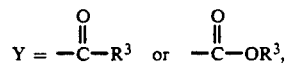

for example,

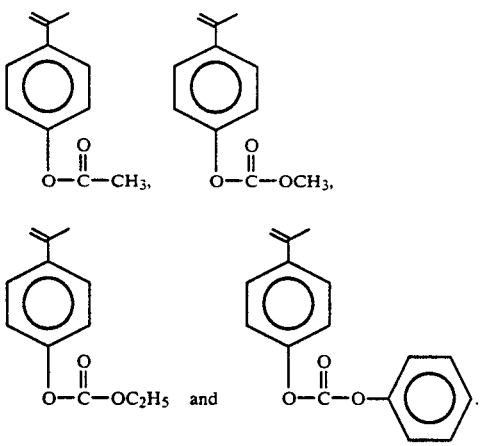

The invention further relates to a process for the preparation of copolymers of the type described above, characterized in that the above-mentioned comonomers are subjected to radical polymerization, in solution, suspension or emulsion at elevated pressure and at −15° C. to 100° C., preferably from 0° to 70° C.

They have average molecular weights of from $10^3$ to $10^7$, preferably from $10^3$ to $2.10^6$ g/mol.

Component a) of the copolymers according to the invention may be ethylenes carrying 1 to 4 fluorine atoms. The bonds of the two carbon atoms not occupied by fluorine may carry hydrogen or chlorine or both. The following are examples of such fluorinated ethylenes: Vinylidene fluoride, tetrafluoroethylene, chlorotrifluoroethylene and vinyl fluoride. Such fluorinated ethylenes may be used singly or as a mixture of several such ethylenes. The compounds used as component a) are preferably the fluorinated ethylenes exemplified above.

Component b) may be one or more comonomers selected from b1), b2), b3) and b4). Straight chain or branched $C_3$–$C_8$-alkylenes containing at least one fluorine atom are components of group b1). The following are examples of substanes of group b1). Hexafluoropropene, 1,1,3,3,3-pentafluorpropene, 3,3,3-trifluoropropene and mono- or polyfluorinated butenes such as hexafluoroisobutene, pentenes, hexenes or octenes. Such compounds may contain chlorine atoms in addition to at least one fluorine atom. The substances of group b1) are preferably $C_3$–$C_6$-alkenes having at least one fluorine atom, most preferably $C_3$–$C_4$-alkenes having at least one fluorine atom.

Group b2) substances are alkyl vinyl ethers having at least one fluorine atom, for example, perfluoropropyl-perfluorovinyl ether, perfluoromethyl-perfluorovinyl ether, perfluoropropyl-vinyl ether and n-butyl-perfluorovinyl ether.

Group b3) substances are open chain or cyclic $C_3$–$C_6$-ketones having fluorinated α,α'-positions, which are copolymerized via the C=O— bond, such as hexafluoroacetone and perfluorocyclopentanone.

Group b4) substances are non-fluorinated $C_2$–$C_4$-alkenes such as ethylene, propene, 1-butene, isobutylene and $C_3$–$C_6$-alkyl vinyl ethers such as methyl vinyl ether, ethyl vinyl ether and the like and $C_4$–$C_6$-vinyl esters such as vinyl acetate, vinyl propionate, etc.

The compounds used as component c) are masked phenols having an olefinically unsaturated group corresponding to formula (I) or mixtures of several of these. Such compounds contain a H or $C_1$–$C_4$-alkyl group in the α-position to the vinyl unit, the methyl group being preferred, and a masked phenol group. Masking of the phenol group is carried out by known processes of converting the group into a trialkylsilyl ether thereof (for example by a reaction with trialkylchlorosilanes) or phenol esters (for example by a reaction with carboxylic acid chlorides or carboxylic acid anhydrides or chloroformic acid alkyl esters, e.g. chlorocarbonic acid methyl ester). The substances used as component c) are preferably compounds in which $R^1$=methyl, $R^2$=hydrogen and Y=acetyl, methoxycarbonyl, ethoxycarbonyl or phenoxycarbonyl. Further, the olefinically unsaturated group and the masked phenol function are preferably in the p-position to one another on the aromatic compound.

In the preferred case that vinylidene fluoride, tetrafluoroethylene, chlorotrifluoroethylene and/or vinyl fluoride is used as component a), other fluorine-containing ethylenes from group a) may be used as comonomers in addition to the fluorine-containing $C_3$–$C_8$-alkenes of component b1).

Components a), b) and c) are basically used in the quantities mentioned above. Components a) and c) are essential components of the comonomers according to the invention. Their quantities add up to 100 mol-% but part of component a) may be replaced by one or more compounds of component b). For this calculation, the sub-groups of b), namely b1), b2), b3) and b4, have equivalent priority and may be in the form of one compound or of a mixture of several compounds from these sub-groups.

The quantity of component c) amounts to 0.1 to 5 mol-%, preferably from 0.2 to 2.5 mol-%, most preferably from 0.3 to 1.5 mol-%. The quantity of component a), or the sum of components a) and b) when sub-groups b1), b2), b3) and/or b4) are used, accordingly amounts to 95 to 99.9 mol-%, preferably from 97.5 to 99.8 mol-%, most preferably from 98.5 to 99.7 mol-%. Within the last mentioned quantities, the quantity of component a) amounts to at least 45 mol-%, preferably at least 48 mol-%, most preferably at least 50 mol-%, the quantity being based on the total molar number of all the comonomers, as also in the case of other quantities given for the copolymers according to the invention. The comonomers of group b) amount to 0 to 54.9 mol-%, preferably up to 51.9 mol-%, most preferably up to 49.9 mol-%, the unsaturated compounds of sub-group b4) which do not contain fluorine being preferably used in a proportion of at most 25 mol-%. The lower limit of 0 mol-% indicates that the comonomers of component b) are optional comonomers of the copolymers according to the invention and may be omitted completely. It has, however, been found advantageous always to use a proportion of component b) in the copolymers according to the invention when the copolymers are to be used as rubbers. These proportions for use in rubbers may be 5 to 45 mol-%, preferably 10 to 40 mol-%, based on the molar number of all the comonomers. These proportions may be distributed over various subgroups of component b) and may include more than one compound. The components b) preferably belong to subgroups b1), b2) and/or b4). The following are examples of combinations of components a) and b) for use as rubber: Vinylidene fluoride/hexafluoropropene, vinylidene fluoride/tetrafluoroethylene/hexafluoropropene, vinylidene fluoride/tetrafluoroethylene/perfluoroalkyl-perfluorovinyl ether, tetrafluoroethylene/vinylidene fluoride/hexafluoropropene/pentafluoropropene, tetrafluoroethylene/vinylidene fluoride/hexafluoropropene/perfluoroalkylperfluorovinyl ether, tetrafluoroethylene/hexafluoropropene/hexafluoroisobutylene, vinylidene fluoride/chlorotrifluoroethylene/hexafluoropropene and tetrafluorethylene/vinylidene fluoride/propene.

Copolymers in which the comonomers of groups a) and b) are present in approximately equimolar quantities are of importance as well as the copolymers described above in which the comonomers of group b) are present in a less than equivalent quantity compared with group a).

Polymerization may be controlled so that the greatest part of the polymer chain contains strictly alternating monomers a) and b) with the occurrence of masked phenols of group c) at relatively large intervals compared with the total quantity of these monomers.

The composition of such copolymers according to the invention containing approximately equal molar quantities of comonomers of groups a) and b), is 45 to 55 mol-% of group a), 44.9 to 54.9 mol-% of group b) and 0.1 to 5 mol-% of group c), preferably 47.9 to 51.9 mol-% of group a), 47.9 to 51.9 mol-% of group b) and 0.2 to 2.5 mol-% of group c). One important example of a combination of two comonomers which are incorporated by polymerization in approximately equal molar quantities is the combination of tetrafluoroethylene/propene, to which is then added the masked phenol from group c).

The known process parameters for the copolymerization of fluorine-containing monomers may be used for the preparation of the copolymers according to the invention. Copolymerization may be carried out in solution, suspension or emulsion (U.S. Pat. No. 2,968,649; U.S. Pat. No. 3,051,677; U.S. Pat. No. 3,053,818; U.S. Pat. No. 3,331,823; U.S. Pat. No. 3,335,106 giving examples of suitable reaction media and general reaction conditions). Radical polymerization is initiated by means of compounds which are known per se and suitable for the given reaction medium. Thus organic, oil soluble, optionally fluorinated peroxides are used for solution and suspension polymerization, e.g. benzoyl peroxide, trifluoroacetyl peroxide or soluble organic azo compounds such as azo-bis-isobutyronitrile. Emulsion polymerization, which ia preferred for the preparation of the copolymers according to the invention, is carried out with the aid of water-soluble inorganic per compounds as initiators, such as persulphates, perborates, percarbonates, etc., generally in the form of their sodium or ammonium salts.

When polymerization is carried out at low temperatures, it is necessary to add decomposition accelerators, depending on the polymerization temperature and the decomposition constant of the initiator; these accelerators are generally reducing agents, and may be sulphur compounds such as sodium sulphite, sodium pyrosulphite or Rongalite C (sodium formamidine sulphinic acid) or organic reducing agents such as ascorbic acid, triethanolamine, metal salts such as iron(II) or cobalt (II) salts, organometallic compounds, etc.

The reaction temperatures for copolymerization are from $-15°$ to $100°$ C., preferably from $0°$ to $70°$ C.

Chain transferring agents such as methanol, isopropanol, isopentane, ethyl acetate, diethyl malonate and carbon tetrachloride may be used, if necessary, for adjusting the molecular weight of the polymers in the course of their formation.

It is a further characteristic of the process according to the invention that copolymerization may be carried out at elevated pressure. This pressure should be at least 5 bar but need not exceed 100 bar.

From 5 to 65 bar is a preferred range for the process according to the invention.

Preparation of the copolymers according to the invention may be carried out batchwise but is preferably carried out by a semicontinuous or continuous process.

In one advantageous variation of the process according to the invention, copolymerization is carried out in emulsion. Fluorinated emulsifiers may be used to stabilize the dispersion. Perfluorinated emulsifiers are preferably used (e.g. water-soluble salts of $C_6$-$C_{12}$ perfluorocarboxylic acid or sulphonic acid). Examples include the sodium or ammonium salts of perfluorooctanoic acid and the lithium salt of perfluorooctane sulphonic acid. The quantities to be used depend on the critical micellar concentration of the emulsifier used in the given system. Thus, for example, the quantity of lithium perfluorooctane sulphonate to be used is from 0.3 to 1% by weight, based on the aqueous phase, whereas sodium or ammonium perfluorooctanoate is required to be used at concentrations of from 1 to 2% by weight.

The pH of the emulsion should not exceed 8. Polymerization is preferably carried out at a pH from 4 to 7.5.

In continuous and semi-continuous processes, fresh supplies of monomers a) to c) are continuously introduced according to the rate at which they are consumed. Component c) may be added to the polymerization system in its pure form or as component of an aqueous dispersion or as a solution in solvents which do not interfere with radical copolymerization. t-Butanol and methyl acetate are examples of such solvents.

The copolymers according to the invention may be cross-linked in the presence of a suitable catalyst system consisting of 1. a "co-accelerator" or acid acceptor consisting of a metal oxide or hydroxide of a divalent metal such as magnesium, calcium, lead, zinc or barium or a basic salt of an organic acid, such as sodium stearate, magnesium oxalate or combinations of several of these in proportions of from 2 to 25 parts by weight, based on 100 parts of polymer and 2. an organic onium compound (ammonium, arsonium, stibonium, phosphonium, aminophosphonium, phosphoran, iminium or sulphonium compounds), e.g. benzyl triphenylphosphonium chloride in proportions of from 0.1 to 3 parts by weight, based on 100 parts of polymer. Onium compounds of this type are known in principle and are used as hardening accelerators for fluorine rubbers in combination with aromatic polyhydroxy compounds or polyamines (see e.g. EP-A-404 411 (Grootaert et al) and the literature cited there).

The hardenable composition which may also contain other fillers is prepared by conventional methods of forming compositions. Thus the fluoropolymers according to the invention which give rise to elastomers may, for example, be worked up into compositions on rollers or in kneaders and subsequently cured in shaping apparatus at elevated temperatures. The compositions may also be processed in solution or solvent-free melts, in which case drying and cross-linking may be carried out in one step after shaping at elevated temperatures, for example for the production of moldings in the form of sheet products, films, fibers or solid three-dimensional bodies. A liquid composition prepared with solvents is eminently suitable for use in coatings or adhesive layers.

Curing of the composition after shaping is carried out at elevated temperatures and may be carried out stepwise until the desired degree of hardness is obtained. For the production of solid, three dimensional mouldings, the product may be subjected to after-curing, for example after an initial curing in a mold which preserves its dimensional stability. The temperature required in this case depends on the time available and should be above 100° C. Curing is preferably carried out at temperatures of 120° C. and higher. Those skilled in the art know that the optimum curing time and temperature depend on such factors as the nature and quantities of the ingredients and the desired properties of the end product.

The fluoropolymers according to the invention are available for further chemical reactions by virtue of their phenolic reactive groups which are formed after removal of the masking group. Further, the fluoro polymers according to the invention have good processing properties such as miscibility with fillers, cross-linking auxiliaries, pigments, etc., so that highly homogeneous compositions or blends can be produced which may subsequently be rapidly cross-linked under mild conditions to form thermostable vulcanizates or hardened moldings or used as hardenable adhesive materials. The degree of cross-linking and hence the physico-chemical properties of the material may be varied within wide limits.

EXAMPLES

Example 1

2500 ml of deionized water were introduced into a 6-liter autoclave. 9 g of lithium perfluorooctane sulphonate and 15 g of potassium peroxydisulphate were dissolved therein. The solution was found to have a pH of 8.S which rapidly fell to below ?.5 after the polymerization temperature had been reached. A nitrogen pressure of 10 bar was then forced three times into the closed autoclave and the pressure was then released to normal pressure. 280 g of hexafluoropropane and 200 g of vinylidene fluoride were then introduced into the autoclave and the reaction mixture was heated to 55° C. with stirring. The pressure inside the autoclave was 24 bar after this temperature had been reached. Polymerization was initiated by the continuous addition at the rate of 10 ml per hour of an aqueous solution containing 2 g of triethanolamine. A monomer mixture of 60 parts by weight of vinylidene fluoride and 40 parts by weight of hexafluoropropene was forced in during the polymerization to keep the internal autoclave pressure constant at 24 bar. 2.6 Parts by weight of p-isopropyl-phenyl ether carbonate for every 100 parts by weight of fluoro monomers were forced into the autoclave at the same time as the fluoro monomers. 270 g of vinylidene fluoride, 180 g of hexafluoropropene and 12 g of isopropenyl-phenyl ethyl carbonate were thus used up by polymerization within a total reaction time of 10 hours. Polymerization was terminated by cooling the contents of the autoclave and the unreacted gas mixture was discharged. A coagulate-free, aqueous emulsion having a pH of 5.4 at a solids content of 18% was obtained. This emulsion was acidified to a pH of about 2 with dilute sulphuric acid to coagulate the product and poured into 3500 ml of a 4% aqueous magnesium sulphate solution. The product was washed with water and then dried to yield 550 g of a rubber-like copolymer containing vinylidene fluoride, hexafluoropropene and p-isopropenyl-phenyl ethyl carbonate. The copolymer is soluble in solvents such as dimethylformamide, dimethylacetamide, acetone, methyl ethyl ketone and tetrahydrofuran. The limiting viscosity number is 0.9 dl/g (DMF, 25° C.). The molar ratio of vinylidene fluoride to hexafluoropropene in the copolymer was determined by $^{19}$F nuclear resinous spectroscopy and amounted to 79:21. The incorporation of p-isopropenyl-phenyl ethyl carbonate was demonstrated by IR spectroscopy. An absorption band was observed at 1750 cm$^{-1}$, which is to be attributed to the carbonyl group of the phenyl ethyl carbonate unit. This band was almost completely preserved after reprecipitation of the copolymer from acetone with toluene. The proportion of p-isopropenyl-phenyl ethyl carbonate in the copolymer was found to be 0.5 to 1 mol-%.

Example 2

Copolymerization of vinylidene fluoride, hexafluoropropene and p-isopropenyl-phenyl ethyl carbonate was repeated by a process analogous to that of Example 1 but in this case 300 g of vinylidene fluoride, 200 g of hexafluoropropene and 7 g of p-isopropenyl-phenyl ethyl carbonate were forced into the autoclave in these constant proportions over a period of 100 minutes to maintain the initial pressure. 464 g of a rubber-like copolymer of vinylidene fluoride, hexafluoropropene and p-isopropenyl-phenyl ethyl carbonate were obtained in which the molar ratio of vinylidene fluoride to hexafluoropropene was 80:20 and the proportion of incorporated p-isopropenyl-phenyl ethyl carbonate units was about 0.4±0.2 mol-%. The copolymer is soluble in the same solvents as the product prepared according to Example 1. The limiting viscosity number is 1.8 dl/g (DMF, 25° C.).

Example 3

300 ml of deionized water were introduced into a 0.7 liter autoclave. 3.9 g of sodium perfluorooctanoate and 1.8 g of potassium peroxydisulphate were dissolved therein. This solution was found to have a pH of 8.5 which sank to below 7.5 within a short time after the polymerization temperature had been reached. A nitrogen pressure of 10 bar was then forced three times into the closed autoclave and the autoclave pressure was then released to normal pressure. 60 g of hexafluoropropene and 60 g of vinylidene fluoride were introduced into the autoclave and the reaction mixture was heated to 70° C. with stirring. When this temperature had been reached, 7.8 g of p-isopropenyl-phenyl acetate dissolved in 12 ml of tertiary-butanol were pumped in within 2 hours. After a total reaction time of 3 hours during which the reaction pressure fell to 20 bar, the autoclave contents were cooled and the unreacted gas mixture was discharged. A cogulate-free, aqueous emulsion having a pH of 3.4 and a solids content of 10.8% was obtained. Isolating the product by a procedure analogous to that described in Example 1 yielded 30 g of a rubber-like copolymer consisting of units of vinylidene fluoride, hexafluoropropene and p-isopropenyl-phenyl acetate. The copolymer is soluble in the same solvents as the copolymer prepared according to Example 1. The limiting viscosity is 0.9 dl/g (DMF, 25° C.).

The molar ratio of vinylidene fluoride to hexafluoropropene in the copolymer is 81:19. The incorporation of p-isopropenyl-phenyl acetate was demonstrated by proton resonance and IR spectroscopy. The absorption band of the carbonyl group of the phenyl acetate unit is found at 1760 cm$^{-1}$ in the IR spectrum. The $^1$H-NMR spectrum shows the signals of the aromatic (phenyl) protons at 6.5 to 8 ppm and the quartet for the protons of the methyl group at 1 to 1.3 ppm. Quantitative analysis of the spectrum was consistent with the copolymer containing 1.5±0.5 mol-% of p-isopropyl-phenyl acetate units.

Example 4

300 ml of deionized water were introduced into a 0.7 liter autoclave. 1.1 g of lithium perfluorooctane sulphonate and 1.8 g of potassium peroxydisulphate were dissolved therein. This solution was found to have a pH of 8.5 which fell to below 7.5 within a short time after the polymerization temperature had been reached. A nitrogen pressure of 10 bar was then forced three times into the closed autoclave and the pressure was then released to normal pressure. 28 g of chlorotrifluoroethylene and 46 g of vinylidene fluoride were introduced into the autoclave and the reaction mixture was heated to 70° C. with stirring. After this temperature had been reached, 7.8 g of p-isopropenyl-phenyl acetate dissolved in 12 ml of tert.-butanol were pumped in within 2 hours. After a total reaction time of 8 hours, during which the reaction pressure fell to 13 bar, the autoclave contents was cooled and the unreacted gas mixture was discharged. A coagulate-free, aqueous emulsion having a pH of 3.4 and a solids content of 13% was obtained. Isolating the product by a procedure analogous to that described in Example 1 yielded 41 g of a rubber-like copolymer consisting of units of vinylidene fluoride, chlorotrifluoroethylene and p-isopropenyl-phenyl acetate. The copolymer is soluble in dimethylformamide and acetone. The limiting viscosity number is 1.2 dl/g (DMF, 25° C.).

The following copolymer composition was determined from the determination of the fluorine and chlorine content and the $^1$H-NMR spectrum:

Vinylidene fluoride/chlorotrifluoroethylene/p-isopropenyl-phenyl acetate: 82/17/ca.1 (molar ratio). Analysis of the $^1$H-NMR spectrum, which only enables the p-isopropenyl-phenyl acetate contents to be roughly determined, showed it to be 1±0.5 mol-%.

Example 5

5 g of the copolymer prepared according to Example 3 were dissolved in 20 g of dimethylformamide. 50 mg of benzyltriphenyl-phosphonium chloride, 300 mg of calcium chloride and 150 mg of magnesium hydroxide were added to this solution. The whole mixture was then cast to form a film 1 mm in thickness and dried at 120° C. for 5 hours. The resulting elastic film was no longer soluble in dimethylformamide. Determination of the gel content in dimethylformamide at 25° C. by the method of M. Hoffmann et al, Polymeranalytik I and II, Georg Thieme Verlag, Stuttgart 1977, indicated 50% by weight of insoluble gel contents.

Comparison Example 6

5 g of a Copolymer of vinylidene fluoride and hexafluoropropene which had been prepared by a method analogous to that described in Example 2 but without the addition of p-isopropenyl-phenyl acetate were dissolved in 20 g of dimethylformamide. 200 mg of bisphenol AF (2,2-bis-(4-hydroxyphenyl)-hexafluoropropane) were added to this solution in addition to 50 mg of benzyl-triphenylphosphonium chloride, 300 mg of calcium hydroxide and 150 mg of magnesium hydroxide. This mixture was used to produce a dried film as described above, which redissolved in dimethylformamide. Determination of the gel content indicated the presence of only 6% by weight of insoluble gel components.

The gel contents mentioned in Example 5 and Comparison Example 6 show that a fluoro polymer according to the invention containing masked phenol groups undergoes cross-linking under the given conditions whereas a pure fluoro polymer remains uncross-linked in the presence of bisphenol AF.

Example 7

A mixture of 100 parts by weight of the copolymer obtained according to Example 1, 6 parts by weight of calcium hydroxide, 3 parts by weight of magnesium oxide, 30 parts by weight of carbon black MT Black N 990 and 0.5 parts by weight of benzyl-triphenyl-phosphonium chloride was prepared on a two-roll rubber compounding rolling mill. This mixture was vulcanized under pressure at 175° C. for 10 minutes and then after vulcanized in a circulating air oven at 200° C. for 24 hours.

The vulcanizate thus produced (100×100×1 mm plates) has the following hardness and tension/elongation characterstics:

| Quantity measured | Example 7 |
| --- | --- |
| Hardness [Shore A] | 58 |
| Breaking strength [N/mm$^2$] | 20.5 |
| Elongation at break [%] | 375 |
| Tension at 100% elongation [N/mm$^2$] | 4.9 |

It will be understood that the specification and examples are illustrative but not limitative of the present invention and that other embodiments within the spirit and scope of the invention will suggest themselves to those skilled in the art.

We claim:

1. A copolymer containing masked phenol groups, comprising monomer units of
   a) from 50 to 99.9 mol-%, based on the molar amount of all the comonomers, of at least one ethylene having 1 to 4 fluorine atoms,
   b) from 0 to 49.9 mol-%, based on the molar amount of all the comonomers, of at least one monomer selected from the group consisting of
      b1) a $C_3$–$C_8$-alkene having at least one fluorine atom,
      b2) an alkyl vinyl ether having at least one fluorine atom,
      b3) a $C_3$–$C_6$ ketone having fluorinated $\alpha,\alpha'$-positions, and
      b4) at least one of a non-fluorinated $C_2$–$C_4$-alkene, $C_3$–$C_6$-alkyl vinyl ether and $C_4$–$C_6$ vinyl ester, and
   c) from 0.1–5 mol-%, based on the molar amount of all the comonomers, of at least one masked phenol having an olefinically unsaturated group, of the formula

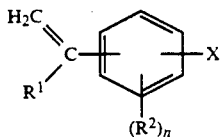

wherein
R¹ = H, C₁–C₄-alkyl
R² = H, Cl, Br, C₁–C₄-alkyl, C₆–C₁₂-cycloalkyl or C₁–C₄-alkoxy, and n = 0, 1 or 2, and

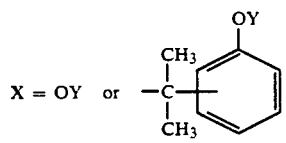

wherein Y = Si(R³)₃,

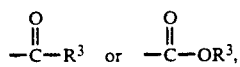

wherein R³ = C₁–C₄-alkyl, C₆–C₁₂-cycloalkyl or a monovalent aromatic hydrocarbon group having 6–9 carbon atoms.

2. A copolymer according to claim 1, wherein (a) comprises at least one comonomer selected from the group consisting of vinylidene fluoride, tetrafluoroethylene, chlorotrifluoroethylene and vinyl fluoride, and (b) comprises at least one of a fluorine-containing ethylene and a fluorine-containing C₃–C₈-alkene.

3. A copolymer according to claim 1, wherein (a) comprises a combination of at least two fluoromonomers selected from the group consisting of vinylidene fluoride/hexafluoropropene, vinylidene fluoride/tetrafluoroethylene/hexafluoropropene, tetrafluoroethylene/vinylidene fluoride/perfluoroalkyl/perfluorovinyl ether, tetrafluorethylene/vinylidenefluoride/propene, tetrafluorethylene/propene, tetrafluoroethylene/vinylidene fluoride/hexafluoropropene/pentafluoropropene, tetrafluoroethylene/vinylidene fluoride/hexafluoropropene/perfluoroalkyl/perfluorovinylether, tetrafluoroethylene/hexafluoropropene/hexafluoroisobutylene and vinylidene fluoride/chlorotrifluoroethylene/hexafluoropropene.

4. A copolymer according to claim 1, comprising about 5 to 45 mol-%, based on the molar amount of all the comonomers, of comonomers of component (b).

5. A copolymer according to claim 1, comprising about 45 to 55 mol-% of comonomers from group a), from about 44.9 to 54.9 mol-% of comonomers from group b) and from 0.1 to 5 mol-% of comonomers from group c).

* * * * *

UNITED STATES PATENT AND TRADEMARK OFFICE
CERTIFICATE OF CORRECTION

PATENT NO. : 5,227,441

DATED : July 13, 1993

INVENTOR(S) : Kruger, et al.

It is certified that error appears in the above-identified patent and that said Letters Patent is hereby corrected as shown below:

Col. 12, lines 7-9   Delete " (a) comprises a " and insert -- the --; delete " at least two fluoromonomers " and insert -- (a) and (b) comprises a member --

Signed and Sealed this

Twenty-second Day of November, 1994

*Attest:*

BRUCE LEHMAN

*Attesting Officer*  *Commissioner of Patents and Trademarks*